United States Patent [19]
Gingerich

[11] Patent Number: 5,743,347
[45] Date of Patent: Apr. 28, 1998

[54] ELECTRIC POWERED SMALL TRACTOR

[76] Inventor: Newton Roy Gingerich, 565 Snyders Rd East, Baden, Ontario, Canada, N0B 1G0

[21] Appl. No.: 545,863

[22] PCT Filed: May 13, 1994

[86] PCT No.: PCT/CA94/00232
§ 371 Date: Nov. 13, 1995
§ 102(e) Date: Nov. 13, 1995

[87] PCT Pub. No.: WO94/26551
PCT Pub. Date: Nov. 24, 1994

[30] Foreign Application Priority Data

May 15, 1993 [GB] United Kingdom ............... 9310036

[51] Int. Cl.$^6$ ........................................ B60K 1/02
[52] U.S. Cl. .............................. 180/65.1; 180/2.2
[58] Field of Search ................. 180/65.1, 65.5, 180/65.6, 291, 292, 6.48, 6.5, 2.2

[56] References Cited

U.S. PATENT DOCUMENTS 4,415,049 11/1983 Weres .............................. 180/6.5

FOREIGN PATENT DOCUMENTS

| 44773 | 1/1982 | European Pat. Off. . |
| 337100 | 3/1989 | European Pat. Off. . |
| 496059 | 7/1992 | European Pat. Off. . |
| 2337637 | 8/1977 | France . |
| 8800771 | 1/1988 | WIPO . |

*Primary Examiner*—Richard M. Camby
*Attorney, Agent, or Firm*—Anthony Asquith & Co.

[57] ABSTRACT

The lawn end garden tractor has independent electric motors for both driven wheels. The motors are combined with reduction gearboxes, and the wheel is mounted on the output shaft of the gearbox. There is no mechanical axle connection. The power to the motors is controlled by an automatic controller as to wheel speed, power being increased/decreased in accordance with whether the wheels are under-running or overrunning relative to manually-controlled speed setting. Steering is controlled by potentiometer on a mechanical steering wheel or by joystick control. The joystick may be on the tractor, or remote. The drive system is suitable also for four-wheel drive.

4 Claims, 3 Drawing Sheets

5,743,347

ELECTRIC POWERED SMALL TRACTOR

This invention relates to the manner of providing and controlling power transfer from a battery pack to the electric drive motors, and to the road wheels of an electric vehicle such as a lawn and garden tractor, for example in the 16 HP size range.

Such vehicles are common and are powered by gasoline or engines, but are not economical or efficient. The noise, fumes, etc of a gasoline tractor can be obtrusive to many users, especially since many lawn and garden tractors are used around buildings and people. Several attempts have been made to provide an electric tractor, with re-chargeable batteries, in that size range.

Given that a lawn and garden tractor is purchased because the lawn and garden is quite sizeable, and therefore the tractor will be subjected to a demanding duty cycle, it is recognised that there is sufficient space on a small tractor to contain the quantity of batteries needed for the duty cycle, if used economically. That is to say, the size available for the battery pack is sufficient for the typical heavy duty cycle, but only if the power is utilised efficiently.

In previous designs of small tractor, the power to the drive motors has been controlled, as to the speed of the wheels, by means of switched resistors. This type of control does not use the electricity economically, in that some of the power goes in heating the resistors; it is also mechanically jerky; and it also has the disadvantage that the control system employs small moving parts which can pose a service problem, given that a lawn and garden tractor can suffer long periods of mechanical neglect.

In previous designs of small electric tractors, the mechanical drive from the electric motor to the road wheels has been complex, involving drive axles, chain drives and sprockets, final drive units, differential gears, etc.

The present invention is aimed at providing a power, and power control, system for a lawn and garden tractor, in which the system uses solid state components, with no exposed moving parts (other than the road wheels). In the invention, individual motors are provided for each road wheel. Preferably, each motor feeds power to its road wheel through a respective simple parallel-shaft, enclosed, speed-reduction gearbox, and the road wheel is attached directly to the output shaft of the gearbox.

The invention thus provides respective drive motors, one for each driven wheel of the tractor. The road wheels preferably are mounted directly on the output shafts of gearboxes connected directly to, and housed with, the drive motors. The driven wheels are not connected by means of a drive axle, and no differential gear or final drive unit is required.

In the invention, the left drive motor drives the left road wheel and the right drive motor drives the right drive wheel. The drive control system is such that each motor is driven to rotate at a particular speed. The motor is supplied with the current or power it needs to maintain that speed, even if load conditions should vary. Thus, the tractor tends to travel in a straight line at a constant speed, or a steered curve, even if one wheel should encounter a small obstacle. Also, the tractor maintains wheel speed even if one wheel should run over a low-grip surface.

Preferably, the motors are arranged to feed energy back into the batteries if the motors are over-running the wheels (when the tractor is decelerating, for example.) Such regenerative braking provides a useful improvement in overall efficiency. Not only that, but an electric tractor contains a battery pack of considerable mass, and the inertia of the tractor might make close maneuvering a little difficult if the tractor were able to run on during over-run. The resistance on over-run caused by regenerative braking substantially improves the feel of the controls, whereby the driver does not feel that the tractor is running away with him.

Besides, on a lawn and garden tractor, braking requirements are not very demanding, and providing regenerative braking means that the only other braking required, if indeed any other is required, can be met by a rudimentary parking brake which can be incorporated into the gearbox if desired.

DETAILED DESCRIPTION OF PREFERRED EMBODIMENT

By way of further explanation of the invention, exemplary embodiments of the invention will now be described with reference to the accompanying drawings, in which.

The apparatuses shown in the accompanying drawings and described below are examples which embody the invention. It should be noted that the scope of the invention is defined by the accompanying claims, and not necessarily by specific features of exemplary embodiments.

Figure 1:
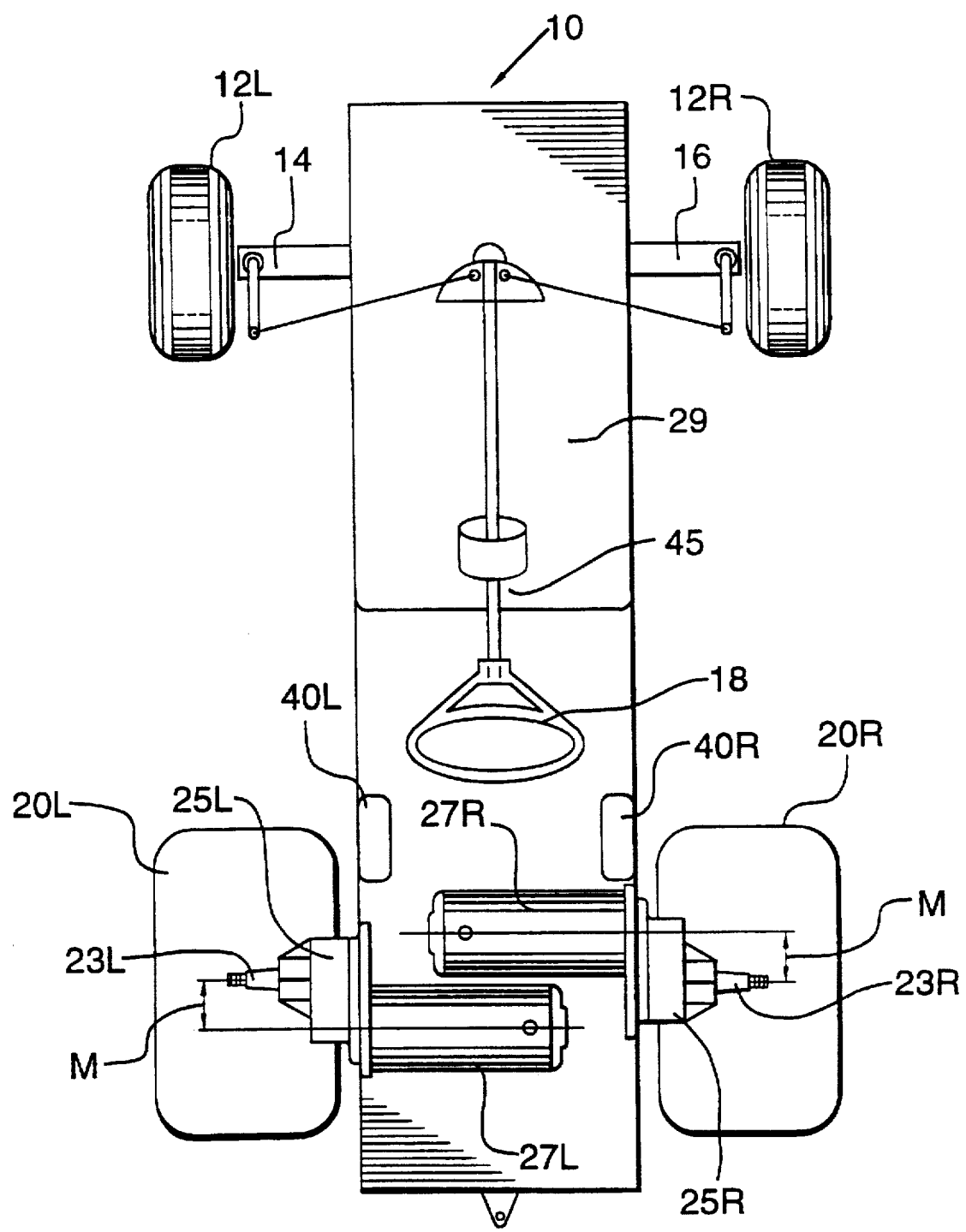
FIG. 1 is a diagrammatic view showing, in plan, a small tractor, of the type generally referred to as a lawn and garden tractor, having a drive system which embodies the invention.

FIG. 1 shows a tractor 10 having a conventional steering system. The non-driven wheels 12L, 12R are mounted at the ends of an axle 14, and are swivel-able about king-pins 16. A steering wheel 18 turns the wheels 12L 12R for steering, as will be apparent from the diagram.

The driven wheels 20L, 20R are not mounted on a common axle. Each wheel has its own axle 23L, 23R, which is mounted directly in the respective gearboxes 25L, 25R. The gearboxes are bolted to respective electric motors 27L, 27R, and to the chassis 29 of the tractor 10. The (two-stage) gearboxes provide a gear ratio between the motor and the road wheel of 30:1. The gearboxes provide a firm mounting and a good bearing spread for the wheel axle bearings.

Figure 3:
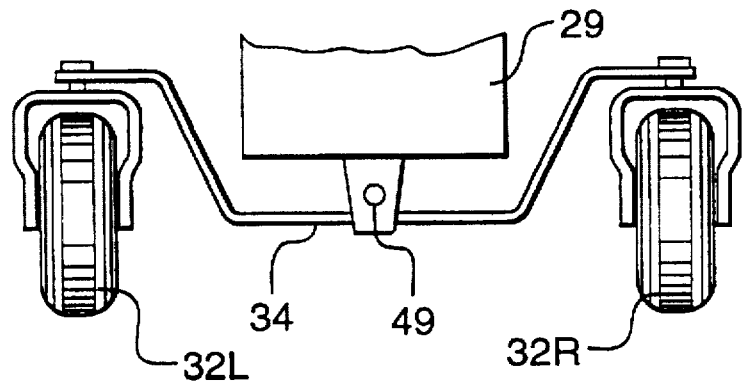
FIG. 3 is a rear elevation of the FIG. 2 tractor.
Figure 2:
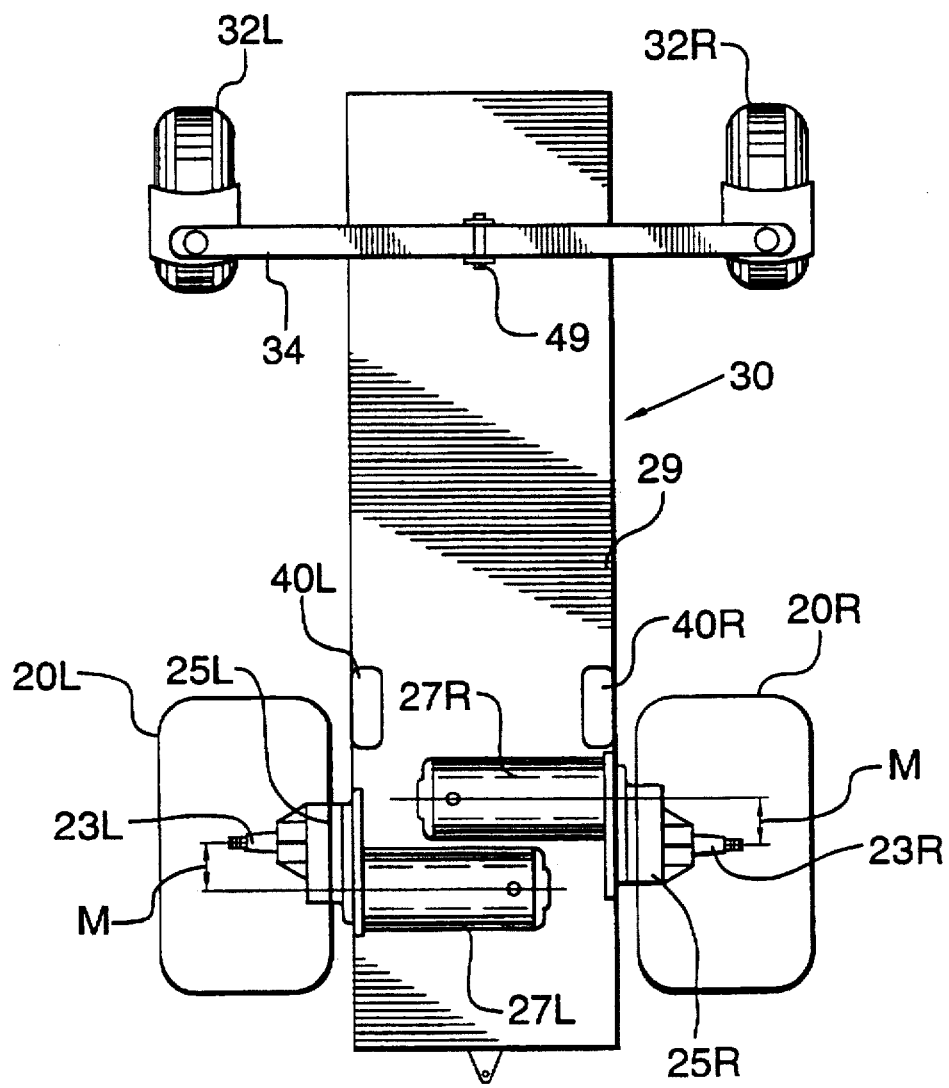
FIG. 2 is a corresponding view to FIG. 1 of another tractor, which also embodies the invention.

The tractor 30 of FIGS. 2 and 3 has the same arrangement of driven wheels as in FIG. 1, and the same reference numerals are used. However, in FIGS. 2 and 3 the non-driven wheels 32L, 32R are mounted as castors. A cross-beam 34 carries swivel-able stirrups 36L, 36R, in which the wheels are mounted.

Lawn and garden tractors generally have no suspension system as such: the tires of the wheels are soft enough to cope with such suspension motions as are called for.

The tractors of FIGS. 1 and 2 have no common drive axle, no final drive gears, and no differential to compensate for the wheels rotating a different speeds when the tractor is being steered around corners. Instead, the tractor has a motor speed control system, which will now be described.

Each wheel 20L, 20R is provided with a respective speed sensor 40L, 40R. This speed sensor may take the form of a revolution-counter, separate from the motor, or may take the form of a generator which rotates with the motor, and which supplies a voltage or frequency signal indicative of the speed of the wheel. Alternatively, the speeds of the DC motors can be derived from the current fluctuations as the armatures pass the poles of the motors. In any event, the speed sensor sends a signal indicative of the speed of the motor (and hence of the wheel) to a controller 43. The signal may be pulses, the frequency of which indicates motor speed, or the signal may be a voltage, the steady level of which indicates motor speed, or the signal may be in any other convenient form.

It is preferred that the speed is sensed from a parameter that is present in, and can be measured in, the power wires going to the motor. In that way, no separate wires are required for the sensor. Thus, it is preferred for the sensor to detect, for example, speed-proportional pulses in the current as the rotor of the motor sweeps the electrical poles: that can be done through the supply wires to the motor. Probably the simplest way of sensing speed is to measure the resistance of the field windings of the motor, which again can be done through the motor supply wires, without special wires to a sensor.

In FIG. 1, turning the steering wheel 18 is effective not only to swivel the steerable wheels but is effective also to change the status of a steering potentiometer 45 mounted on the steering column. In FIG. 2, there is no steering wheel: instead, steering is effected entirely electrically, by means of a joystick 47. Manipulation of the joystick again is effective to change the status of the steering potentiometer 45.

The output of the steering potentiometer provides a reference signal for comparing the speeds of the left and right motors. The designer of the system sets in a formula or algorithm such that when the steering wheel is turned through a particular angle, the driving wheels are set to rotate at speeds which differ by a particular differential speed. That is to say, the wheel on the outside of the curve is constrained to move at a faster speed than the wheel on the inside of the curve, and the wheel speeds are constrained to differ by a predetermined amount.

In FIG. 1, this constraining of the wheels to rotate at different speeds ensures that the non-steerable, driven, wheels follow the steered, non-driven, wheels around a corner, just as if the tractor had been equipped with a mechanical differential gear. In FIG. 2, there is no steering wheel, and the differential speeds of rotation of the left and right wheels is the sole factor which causes and controls the steering motions of the tractor.

The behaviour of the FIG. 1 tractor is not always as if the tractor had been equipped with a mechanical differential gear. For example, when one driven wheel is on ice or other low friction surface, and the other wheel is on a normal friction surface, the differential speed control system ensures that the wheel on ice does not speed up, as would happen with a mechanical differential. The control system ensures that the difference in wheel speeds always corresponds to the desired turning radius, as set by the steering wheel or joystick, irrespective of the friction grip of the tires to the surface.

The speed control system automatically sets the power supplied to the motor to the value necessary to maintain the speed as dictated by the speed control potentiometer.

Similarly, if the tractor should encounter such an obstacle, for example, as when one wheel passes over a tree root or the like, that wheel does not slow down and then speed up; the control system momentarily feeds extra power to the motor to drive the wheel over the obstruction without losing speed, and then reduces the power to the motor as the obstruction passes, without the motor gaining speed.

The speed of the tractor may be set by the driver by means of a separate accelerator/brake control. The setting of this control defines the average of the speeds of the left and right wheels; the steering potentiometer defines whether the wheels are to rotate both at the same speeds, or at proportionately different speeds. Alternatively, instead of one control for vehicle speed and one for steering, the designer might provide two separate wheel speed controls, one for each wheel, which the driver can operate together or independently.

The tractor is equipped with a switch for changing between forward and reverse motion.

In the FIG. 1 tractor, maneuvering is accomplished as in an ordinary front-wheel-steering, mechanical-rear-axle-differential equipped vehicle. Thus the FIG. 1 tractor "feels like" a normally-steered vehicle. The difference in speeds between the left and right rear wheels is in fixed correspondence with the angle through which the steered front wheels are turned.

The FIG. 2 tractor steers in what seems an unnatural manner, which is quite unlike a conventional vehicle. On the other hand, the steering system of FIG. 2 makes the tractor highly maneuverable around obstacles. Also, the tractor can turn in very tight circles. Also, the tractor's maneuverability is not dependent on the friction of the surface remaining constant.

In FIG. 2, when the accelerator/brake control is set to move the tractor forward only very slowly, if at that time the steering is turned to a full-turn position, it can happen that the difference in the speeds of the wheels, as dictated by the steering potentiometer, makes one wheel turn in reverse. For example, if the accelerator/brake control is set to a forward speed corresponding to a wheel speed of say 10 rpm, and if the steering control requires a speed differential of say 26 rpm, then the left wheel turns at 23 rpm forwards, and the right wheel turns at 3 rpm in reverse. Equally, if the accelerator/brake control is set to zero, and the steering control is set to a full-turn position, the tractor will spin on its Yaw-axis.

If the FIG. 2 tractor should become bogged down in a patch of slippery ground, therefore, and the driver attempts different accelerator and steering maneuvers in order to extricate the tractor, it can happen that the tractor comes out of the patch of slippery ground at an unpredictable angle. However, the tractor never moves with an unpredictable speed, so there is little safety problem associated with the FIG. 2 steering system. With a little practice, a driver soon becomes accustomed to the unusual steering behaviour, and from then on welcomes the extra dimensions of maneuverability it provides.

The FIG. 2 steering system with a mechanical differential drive would be impractical for a small tractor. The system can only be effectively controlled if the wheels are, or can be, constrained to move at pro-determined speeds.

It might be considered that the FIG. 2 steering system could be done non-electrically, by providing hydraulic drive motors, one to each wheel, and this could theoretically be done; however, an hydraulic system would be prohibitively expensive in the context of a lawn and garden tractor.

FIG. 3 shows the cross-beam 34 on which the castors 32L,32R are mounted. The beam is arranged for pivoting in the Roll-mode of the tractor about the swivel pin 49. When the tractor passes over uneven ground, the beam axle can follow such Roll-mode movement as may be required. The beam is cranked so that the pin 49 lies close to the ground, whereby the castors follow the movement over a favourable portion of the beam's are of swivel.

In FIG. 1 and FIG. 2, it will be noted that, in respect of each of the electric drive motors 27L,27R, the axis of the armature of the drive motor lies parallel to the axle 23L,23R of the corresponding wheel 20L,20R. The motor armature is not co-axial with the wheel axle, however, but is offset therefrom.

The magnitude M of the offset between the motor armature axis and the wheel axle is important. Of course, the two wheels 20L,20R must be co-axial. The offset M should be large enough, in relation to the diameter D of the casings of the motors, that the two motors 27L,27R can be mounted side-by-side on the chassis: that is to say, the offset is large enough that the motors can be mounted overlapped one behind the other, when viewed in the longitudinal sense relative to the tractor.

If the chassis of the lawn and garden tractor were wide, ie wider than the length of the two motors put together, then it would not matter whether the motors were overlapped; but since, in a lawn and garden tractor, the chassis is narrow compared with the length of the electric motors (that is one of the characteristics of a lawn and garden tractor) it is very advantageous that the offsets as described permit the overlapping arrangement.

The double reduction gearboxes 25L,25R are arranged so that the wheel axle and the motor armature are parallel. Such a gear arrangement involves a relatively modest expense, as compared with, for instance, the expense of a gearbox that had to accommodate a crown bevel gear to provide an angle difference between the armature and the axle.

It is recognised that the large offset M allows the wheels 20L,20R to be co-axial, but allows also the physical bulk of the motors to be accommodated in the relatively narrow chassis. The combined motor/gearbox unit as illustrated is available as a proprietary unit, of excellent economy and service reliability. The road wheels are mounted directly on the gearbox output shaft, and so sturdiness is important. If the drive system had to be designed around, say, a chain drive, the limitations of that would be much more restrictive on the designer.

It is one of the features of the invention is that the two motors are each driven at pre-determined speeds. When the tractor is moving in a straight line, power is supplied to the left and right motors so as to keep both of them rotating at the same speed, irrespective of variations in the ground surface etc. When the tractor is moving around a curve, power is supplied to the left and right motors so as to keep them rotating at some pro-determined ratio of speeds.

When more power is required to keep the motor turning at the desired rpm —when, for example, one tractor wheel encounters an obstacle—so the power supplied to the motor increases. Cut-outs are included in the controller to prevent the extra current from rising so high as to cause damage. However, the cut-outs are time-dependent: an electric motor can withstand considerable current for a short period, and can withstand very high current for periods of a few seconds.

The control system as described makes use of regenerative braking. A small electric tractor has the characteristic that a large proportion of its weight is taken by batteries. Therefore, when one or both of the wheels is over-running its respective motor, the inertia of the tractor can be considerable, even though the tractor moves at hardly more than walking pace.

The system of driving the wheels of the tractor as described herein is practically useful for small tractors in the power range of 10 to 20 HP, preferably 15 or 16 HP, as those ratings are applied to gasoline engine-powered tractors. Above that size, the tractor is physically too large and too powerful to be powered, economically and practically, by a rechargeable battery pack. Below that size, the tractor is too small to be practical. (It will be understood that these figures can change, as the power output available from batteries is constantly being improved.)

As mentioned, the above mentioned power ratings are equivalent to the ratings generally given to gasoline powered tractors. The motors actually used in the tractors are of roughly the same size as electric motors rated for continuous use at 0.8 HP. As mentioned, the motors have substantial capability to be supplied with very high current for short periods. The designer will generally set the voltage to be used on the tractor at 36 or 48 volts, and may arrange for short-lived current of 100 amps or even more at that voltage.

The tractor may be used with different attachments, such as a grass cutter, a snow plough, a snow blower, a tippable scoop or wheelbarrow for carrying and dumping loads, etc.

Another useful item that can be included on the tractor is the type of implement known as a WeedEater (™) in which a plastic wire spins at high speed. A normal mains-voltage model can be used if a suitable voltage inverter is provided on the tractor. It is very simple and convenient also to provide a rack or hook for the WeedEater on the tractor. In his task of cutting a large area of grass, therefore, the driver can break the task up into periods of sitting on the tractor and periods of using the WeedEater, which breaks up both tasks, and takes away much of the "chore" character of both tasks.

The motor controls include two-quadrant choppers capable of accelerating and decelerating the motors, making the tractor highly responsive to operator control. Current and voltage feedback circuits improve the response of the unit to asymmetric variations in drive-wheel torque. The capacity for high peak current enable rapid motor acceleration. The chopper is a high-efficiency power semi-conductor device which, in combination with a motor and freewheeling diode, behaves like a variable output voltage DC-to-DC converter. By varying the effective output voltage of this converter, the operator can vary the speed of the DC motor. A "one-quadrant" chopper is capable of accelerating a DC motor in one direction only: a four-quadrant chopper is capable of accelerating and decelerating a DC motor in both directions.

The system provides that the speed of the wheels is determined purely by the electrical settings of the controls. The motors draw current as required, to maintain speed. This results in smooth progressive operation, with no jerks.

Figure 4:
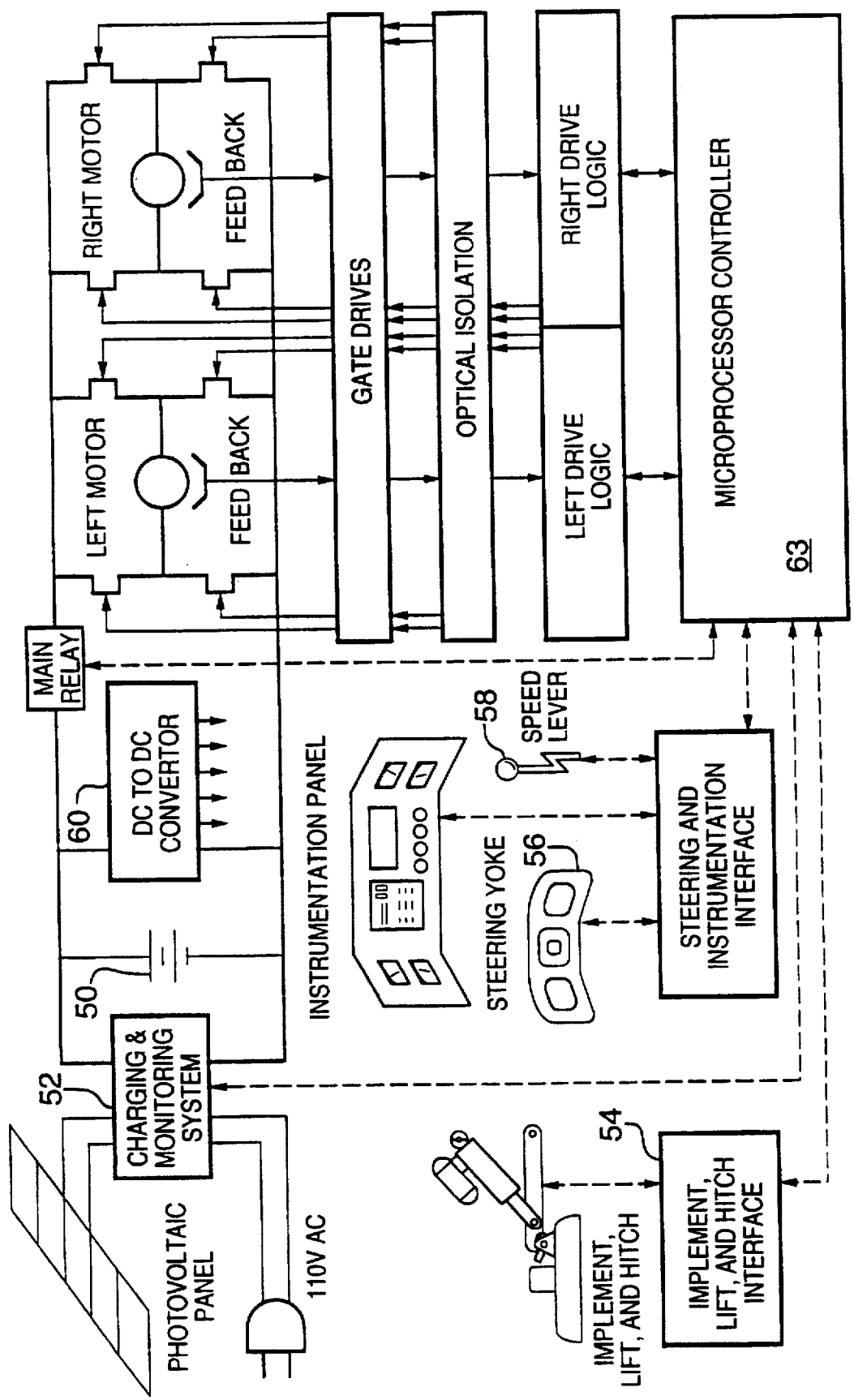
FIG. 4 is a block diagram of a control system for the FIG. 2 tractor.

FIG. 4 shows the electrical arrangement of the tractor, in diagrammatic form. The batteries 50 of the tractor may be recharged by plugging into a mains-or solar-powered charger 52, or as available. The tractor includes means 54 for hitching and unhitching accessories such as a grass-cutter, snowblower, or the like.

The tractor may have a steering yoke 56 to control left/right steering, a separate forward/reverse switch to control direction, and a separate speed lever 58 to control speed. Alternatively, all three of these functions can be provided by a single joystick. The single joystick may be set up so that fore/aft motion of the joystick controls both direction and speed, and so that left/right motion of the joystick controls steering.

The joystick on the tractor may be duplicated by (or even replaced by) a remote-control joystick, which operates the tractor by radio or other transmissions. The electrical control system can be arranged to require only a non-active potentiometer output from the joystick, which can easily be duplicated by radio control.

The control of power to the motors is done by chopping the current at programmed intervals, and at a programmed frequency. Power is supplied to the motor therefore via what is, in effect, a DC-to-DC converter 60. The relationship between frequency and on/off chopping ratio is controlled by the microprocessor 63 so as to maximise efficiency of the drive system, ie to keep the drive current at a minimum for a particular setting of the joystick.

The speed control system as described may also be used to control a four-wheel drive tractor. A single joystick (on board or remote) can even be used in that case also. The control system simply determines at what speed each wheel should be running, given the inputs from the joystick, and regulates the current to the motors accordingly. Preferably, mechanically-separate motors are provided, one to each wheel.

When all four wheels are driven, provision may also advantageously be made for the tractor to be steered and driven in crab-fashion: that is to say, in which the back wheels and the front wheels are both turned (or both made to rotate at differential speeds) in order to make the tractor move sideways. Crab steering can be useful when operating the tractor on the side of a hill, for example.

In place of the proprietary motor/gearbox unit as illustrated, the drive unit may be a high-torque motor without a gearbox, or a stepper motor, with or without a gearbox. A stepper motor of course is very readily controlled as to its speed of rotation.

When the tractor encounters a hill, theoretically no change of the joystick position is needed to make the tractor go uphill. However, people naturally feel the need to increase the throttle setting when going up a hill. To improve the "feel" of the drive system, therefore, a little bias may be added in the controls such that an equal resistance to both wheels (indicating a hill) requires a slight extra pressure on the joystick.

The drive motors preferably should be of the type which can exert a high torque at low or zero speed. The need for the tractor to have energy-absorbing brakes can be reduced in that case. (The tractor should have at least a parking brake, for safety reasons.)

The drive system as described is not suitable for road-going vehicles, for which there are safety requirements for a mechanical connection between the steering wheel and the road wheels. The system is most suited to a small tractor, wherein the chassis of the tractor is relatively narrow as compared with the size of the drive motors, and wherein there is little requirement for suspension. The drive system as described also has limitations in that, without drive transmission shafts, gears, etc, there is a practical maximum to the level of electrical power that can be conveniently fed to the wheels, whereby the system would not be appropriate for a vehicle larger than a lawn/garden tractor. Another type of small vehicle wherein steering control can be allowed to be independent of mechanical connections is a motorized wheelchair, and the invention may be applied to that.

Examples of the background art which can be regarded as useful for the understanding, searching, and examination of the invention are cited in the annexed international search report.

I claim:

1. Electric-powered vehicle, having a vehicle frame, wherein:

The vehicle includes left and right drive-wheels;

the left and right drive-wheels lie in a co-axial relationship to each other;

the vehicle includes left and right electric drive motors;

the left and right motors are mechanically independent of each other;

the left and right drive wheels are mechanically free to rotate independently of each other;

the left motor is mechanically drive-coupled to the left drive-wheel, and the right motor is mechanically drive-coupled to the right drive-wheel;

the vehicle includes a battery pack;

the vehicle includes a speed and steering controller;

the speed and steering controller includes a means for receiving power from the battery pack, and a means for feeding required amounts of that power to the two motors;

the vehicle includes left and right speed sensors, for sensing the respective rotational speeds of the two drive-wheels, and for sending to the controller signals indicative of the instant values of those rotational speeds;

the vehicle includes settable input means for setting a respective desired speed of each motor, whereby the input means is effective to set a desired speed of the vehicle, and to set a desired steering radius of the vehicle;

the controller is effective, if the signal from the speed sensor of the left drive wheel indicates that the left drive wheel is rotating at less than the desired speed for that wheel, to increase the power from the battery to the left motor;

the controller is effective, if the signal from the speed sensor of the right drive wheel indicates that the right drive wheel is rotating at less than the desired speed for that wheel, to increase the power from the battery to the right motor;

the controller is effective, if the signal from the speed sensor of the left drive wheel indicates that the left drive wheel is rotating at more than the desired speed for that wheel, to reduce the power passing from the battery to the left motor;

the controller is effective, if the signal from the speed sensor of the right drive wheel indicates that the right drive wheel is rotating at more than the desired speed for that wheel, to reduce the power to the right motor;

in respect of each motor, if the actual speed of the wheel differs from the set speed of the wheel, the controller is effective to increase the power supply to that wheel, proportional to the difference;

the vehicle includes left and right actuable regenerative braking means, respective to the left and right wheels, and wherein, if the wheel is over-running one of the motors, the controller is effective to actuate regenerative braking in respect of that motor;

the controller is effective to control the speeds of the motors such that the speed setting of one wheel is greater than that of the other wheel by an amount to suit the radius of a steering turn;

the vehicle includes means for chopping electrical current to the motor at a programmed frequency and programmed on/off ratio;

and the speed sensor comprises a means for determining an electrical parameter that varies with the rotational speed of the motor, and which is present in the wires supplying current to the motor.

2. Vehicle of claim 1, wherein the said electrical parameter is the electrical resistance of the field windings of the motor.

3. Vehicle of claim 1, wherein the said electrical parameter is the frequency of pulsations in power supplied to the motor, as a result of a rotor of the motor sweeping poles of the motor.

4. Vehicle of claim 1, wherein the input means comprises a joystick, in which movement of the joystick in the forward/reverse mode controls both the direction and speed of the vehicle, and movement of the joystick in the left/right mode controls the steering of the vehicle.

* * * * *